United States Patent [19]
Antonelli et al.

[11] Patent Number: 5,468,801
[45] Date of Patent: Nov. 21, 1995

[54] DUAL STABILIZED MICROPARTICLES

[75] Inventors: Joseph A. Antonelli, Riverton, N.J.; Christopher Scopazzi, Wilmington, Del.

[73] Assignee: E. I. Du Pont de Nemours and Company, Wilmington, Del.

[21] Appl. No.: 310,053

[22] Filed: Sep. 22, 1994

Related U.S. Application Data

[63] Continuation of Ser. No. 813,184, Dec. 24, 1991, abandoned.

[51] Int. Cl.⁶ .................................................. C08L 51/00
[52] U.S. Cl. ........................ 524/504; 524/507; 524/513; 525/72; 525/74; 525/77; 525/78; 525/79; 525/80; 525/84; 525/85
[58] Field of Search .................................. 524/504, 507, 524/513; 525/72, 74, 77, 78, 79, 80, 84, 85

[56] References Cited

U.S. PATENT DOCUMENTS

| | | | |
|---|---|---|---|
| 4,147,688 | 4/1979 | Makhlouf et al. | 524/461 |
| 4,746,714 | 5/1988 | Spinelli et al. | 525/286 |
| 4,849,480 | 7/1989 | Antonelli et al. | 525/303 |
| 5,010,140 | 4/1991 | Antonelli et al. | 525/269 |

*Primary Examiner*—Paul R. Michl
*Assistant Examiner*—Mark L. Warzel

[57] ABSTRACT

Dispersed polymers comprising microparticles stabilized with two kinds of steric stabilizers are disclosed. The first stabilizer is an essentially linear polymer having a terminal end attached to the microparticle. The second stabilizer is a graft or comb polymer comprising an acrylic backbone having side chains. This stabilizer, in contrast to the first stabilizer may be attached to the core by means of a plurality of functional groups placed along the backbone of the graft polymer.

15 Claims, No Drawings

DUAL STABILIZED MICROPARTICLES

This is a continuation of application Ser. No. 07/813,184 filed Dec. 24, 1991, now abandoned.

The present invention is directed to a dispersed polymer which is characterized as a dual stabilized microparticle. In particular, such a dispersed polymer comprises two kinds of steric stabilizers attached to the macromolecular core or microparticle.

BACKGROUND OF THE INVENTION

Dispersed polymers, including both non-aqueous dispersion (NAD) polymers and microgels, have been found useful as rheology control agents and as toughening agents in coating compositions. Such dispersed polymers are referred to as sterically stabilized microparticles. They comprise a microparticle or core component and, attached to this core component, a polymeric stabilizer component which sterically stabilizes the core component in the dispersing medium. The microparticle or core component is a macromolecular polymer which is not soluble in the dispersing medium, either because of incompatibility or, as in microgels, by substantial crosslinking. The sterically stabilized microparticles are conventionally prepared by free radical addition polymerization of monoethylenically unsaturated monomers, which constitute the core, in the presence of the stabilizing polymer component and a hydrocarbon dispersing medium.

Typically, the stabilizer component is one of two kinds: (1) a linear polymer which may have a single or a plurality of polymerizable functional groups along the polymeric chain, or (2) a graft or block polymer composed of two segments, one of which is soluble and the other insoluble in the dispersing medium. For example, U.S. Pat. No. 4,591,533 to Antonelli et al. teaches stabilizers of the first kind, are linear acrylic polymers prepared by free radical addition polymerization of monoethylenically unsaturated monomers. The stabilizers thus formed have a plurality of further polymerizable vinyl unsaturated groups distributed randomly along the polymer chain. U.S. Pat. No. 4,746,714 to Spinelli et al. discloses other stabilizing polymers of the first kind, which are also linear acrylic polymers, but which are prepared by what is referred to as group transfer polymerization process, so that the stabilizing polymers each have a single terminal functional group for attachment to a microparticle. Finally, U.S. Pat. No. 5,010,140 to Antonelli et al. discloses still other stabilizing polymers of the first kind, but which are prepared using a catalytic chain transfer agent containing cobalt. The latter stabilizing polymers also have terminal vinyl unsaturation.

Examples of the second kind of stabilizing polymers employed to sterically stabilize and disperse microparticles are disclosed in numerous patents, including U.S. Pat. No. 4,147,688 to Makhlouf et al. and U.S. Pat. No. 4,220,679 to Backhouse. Such stabilizing polymers comprise an insoluble or anchor segment, typically an acrylic polymer, to which is grafted or attached a soluble segment. Typically, the dispersing medium is a hydrocarbon solvent so that the soluble second, sediment is a molecule or polymer of low polarity. Some common examples of such soluble segments include poly(12-hydroxystearic acid), poly(2-ethylhexylmethacrylate), poly(laurylmethacrylate), and poly(stearylmethacrylate).

U.S. Pat. No. 5,025,060 and European published application EP 422647 disclose dispersed particles having a combination of two different macromonomer stabilizers A and B. However, neither macromonomer has only one terminal point of attachment to the microparticle or core, but rather have a distribution of polymerizable unsaturated double bonds for attachment.

The kind or composition of polymer employed to stabilize a micro,article determines the dispersability and compatibility of the resulting non-aqueous dispersion (NAD) polymer or microgel. Stabilizers of the first kind, indicated above, are generally good for providing non-aqueous dispersion (NAD) polymers that are compatible and well dispersed in as non-flocculated state in predominantly acrylic coating compositions. However, this may result in the use of a large amount of such dispersion polymers to achieve the desired theology control. On the other hand, stabilizers of the second kind mentioned above are generally good for providing non-aqueous dispersions or microgels that are in a relatively flocculated state in acrylic coating compositions. It is known in the art that such flocculated dispersions can provide for good shear thinning characteristics which lead to good sag resistance and/or metallic flake control in coatings. The extent of flocculation and hence shear thinning depends on the degree of incompatibility of the stabilizer with the resins comprising the coating binder. Therefore, a high degree of shear thinning is possible at low levels of stabilized microparticles through the use of stabilizers of the second kind, wherein the soluble segment of the stabilizer is highly incompatible with the coating binder resins. However, the attainment of good sag resistance or metallic flake control is generally at the expense of leveling, and a finish with unacceptable gloss and distinctiveness of image (DOI) may result. The balancing of rheology control and levelling is generally difficult. Also, the incompatibility of the stabilizer with the binder resins can result in "kick-out" of the stabilized microparticles and the formation of seed. This is especially evident in highly polar binder systems.

It would thus be highly desirable to obtain an improved stabilized microparticle that can be tailored to achieve the desired rheology control without sacrificing gloss or distinctness of image and which does not tend to kick-out when employed in the coating composition.

SUMMARY OF THE INVENTION

The present invention relates to sterically stabilized microparticles which have dual stabilization. In particular, the stabilizer component is a mixture of two kinds of stabilizers. The first kind of stabilizer is an acrylic macromonomer which is attached to the microparticle at a terminal end thereof. The second kind of stabilizer is a graft or comb polymer comprising soluble side chains. In a composition employing the dual stabilized microparticles of the present invention, it is possible to obtain the desired degree and balance of shear thinning properties by varying the amounts of each of the two kinds of stabilizers associated with the microparticles.

DETAILED DESCRIPTION OF THE INVENTION

The present invention is directed to improved microgels or NAD polymers, which are characterized by dual stabilization. These dispersed polymers comprise a macromolecular core, also referred to as a microparticle, which is sterically stabilized by at least two kinds of steric stabilizers. These stabilizers surround and are covalently bonded to the core. At least a part of the stabilizer is soluble and thus extendable in the medium. The central core, on the other hand is generally insoluble in the medium, due to incompatibility and/or crosslinking.

With respect to the microparticle or core component, its preparation is described in the above cited U.S. Pat. No. 4,746,714, hereby incorporated by reference in its entirety. Illustrative monomers, which can be used to make the core, are specifically mentioned in column 3, line 55 to column 4, line 25. In addition, isocyanate, silane, and amine functional monomers can also be used. Preferred monomers are methyl methacrylate, hydroxyethyl methacrylate or acrylate, methacrylic acid, methyl acrylate, styrene and glycidyl methacrylate, and acrylonitrile.

For stabilizing the microparticle, a first kind of stabilizer polymer, a substantially linear acrylic macromonomer, may be prepared as described in U.S. Pat. No. 4,746,714 or U.S. Pat. No. 5,010,140, also hereby incorporated by reference in its entirety. These stabilizer polymers are substantially or essentially linear polymers, each having only a terminal polymerizable functional group or vinyl unsaturation which may be attached to the core.

The monomers used to prepare the linear stabilizer component according to the invention can be any of the conventional polymerizable ethylenically unsaturated monomers. Preferred monomers are butyl methacrylate, isobutyl methacrylate, 2-ethylhexyl methacrylate, hydroxy ethyl methacrylate, methyl methacrylate, glycidyl methacrylate, itaconic acid or anhydride, maleic acid or anhydride, styrene, isocyanatoethyl methacrylate, methylacrylic acid, acrylic acid, silanes, isocyanates, and amines. The amounts and ratios of different monomer units in the final polymer is a matter of choice, as will be understood by those skilled in this art.

These linear stabilizers may be prepared by means of a group transfer agent, as in U.S. Pat. 4,746,714, or by means of a catalytic cobalt chain transfer agent, as for example employed in U.S. Pat. 5,010,140. Cobalt chelates are preferred, especially those described in U.S. Pat. No. 4,680,352 to Janowicz and Melby, and U.S. Pat. No. 4,722,984 to Janowicz. Most preferred are pentacyanocobaltate (II), diaquabis(borondifluorodiphenylglyoximato) cobaltate (II), or diaquabis(borondifluorodimethylglyoximato) cobaltate (II).

A preferred general method of preparing a linear polymer stabilizer comprises first mixing the stabilizer monomers in an organic liquid. The mixture is heated, preferably to reflux temperature for ease of control, and thereto is added the catalytic chain transfer agent of choice, additional monomer(s) and solvent, and the usual amount of a conventional polymerization initiator such as azo- or peroxide initiators. The reaction is run, with additions of monomers and initiator as needed, until the desired stabilizer component is obtained (ordinarily having a $M_w$ of 5000–12000).

A second kind of polymer used to stabilize the microparticle is a graft or comb polymer comprising an acrylic backbone having side chains comprising one or more units of a relatively non-polar compound such as 12-hydroxystearic acid, laurylmethacrylate, stearylmethacrylate or 2-ethylhexylmethylacrylate. This graft polymer stabilizer, in contrast to the first stabilizer, may be attached to the core by means of a plurality of functional groups placed along the backbone of the graft polymer. The side chains are generally soluble, and the backbone, of different polarity from the side chains, are generally insoluble in the dispersing medium. The backbone is anchored by covalent bonding to the polymer microparticles. A suitable example of such a graft has a backbone of an acrylic polymer chain, derived predominantly from methyl methacrylate, and has pendant chains which are residues of poly(12-hydroxystearic acid) and which are readily soluble by an aliphatic hydrocarbon medium. Such a copolymer may be made by first reacting poly(12-hydroxystearic acid) with glycidyl acrylate or glycidyl methacrylate, whereby the terminal —COOH group in the polymeric acid is converted to an ester derivative containing a polymerizable unsaturated group, and then copolymerizing that derivative with methyl methacrylate and glycidyl methacrylate, together with optionally minor proportions of other copolymerizable monomers. The glycidyl methacrylate is then coreacted with acrylic or methacrylic acid to introduce vinyl unsaturation on the graft copolymer backbone. These sites serve to covalently anchor the stabilizer to the core.

Alternatively, the pendant chain can be derived from a macromonomer which is a substantially linear copolymer with a terminal vinyl unsaturation. Such a macromonomer can be made using a group transfer process or a cobalt special chain transfer process as exemplified below. The macromonomer used to form the pendant chain in the graft polymer stabilizer can be the polymerization product of monomers selected from the same group of monomers mentioned with respect to the first linear stabilizer polymer. As mentioned above, the macromonomer should be generally soluble in the dispersing media.

The stabilized microparticles may be produced in a variety of ways. Preferably they are produced by a process of dispersion polymerisation of monomers, in an organic liquid in which the resulting polymer is isoluble, in the presence of the steric stabilizers for the particles. Typically, an organic liquid which is a solvent for the stabilizer component but a non-solvent for the core component is added to the stabilizer solution obtained previously. "Solvent" and "non-solvent" are being used in the conventional sense, as will be understood by those skilled in the polymer art. Illustrative of organic liquids which can be used are aromatic and aliphatic hydrocarbons such as heptane and VM&P naphtha. Mixtures of liquids can also be used. The stabilizer/liquid ratio is of secondary importance, but is usually in the range 1/2 to 1/4 (by weight). The resulting mixture is again heated and thereto are added the core monomers, preferably additional stabilizer, and a conventional initiator such as one of those previously mentioned, in the usual amount. Polymerization is continued, with additions of liquid and initiator as needed, until it is complete, as determined by periodic sampling and analysis.

Suitable processes of dispersion polymerisation are well-known and extensively described in the literature. Thus, regarding the dispersion polymerisation of ethylenically unsaturated monomers such as acrylic or methacrylic acid esters, vinyl esters, styrene, and the like, the procedure is basically one of polymerising the monomers in an inert liquid in which the monomers are soluble but the resulting polymer is not soluble, in the presence dissolved in the liquid of an amphipathic stabilizing agent. The skilled artisan may refer to, for example, "Dispersion Polymerisation in Organic Media:, ed K. E. J. Barret (John Wiley and Sons, 1975). Suitable ethylenically unsaturated monomers include methyl methacrylate, methyl acrylate, ethyl methacrylate, butyl methyacrylate, ethyl acrylate, hydroxyethyl acrylate, hydroxyethyl methacrylate, vinyl acetate, vinyl propionate, styrene and vinyl toluene, and the like. The production specifically of dispersions of crosslinked addition polymer particles can be achieved by including, in the monomers selected, pairs of monomers containing (in addition to the polymerizable unsaturated groups) groups capable of entering into chemical reaction with each other; for example, the epoxide and carboxyl groups contained in glycidyl methacrylate and methacrylic acid. By following the procedures particularly described in British Patent Nos. 1,095,288 and 1,156,012, for example, particles are obtained in which there are present such complementary groups which, although not at that stage co-reacted, can be caused to co-react and so form cross-links by subsequently heating the dispersion to a suitably elevated temperature. Cross-linked addition polymers may also be prepared in dispersion by including in the monomers undergoing dispersion polymerization a minor proportion of a monomer which is difuntional with respect to the polymerization reaction, such as ethyleneglycol dimethacrylate or divinylbenzene.

In general, the total polymeric and oligomeric components of a coating composition are conventionally referred to as the "binder" or "binder solids" and are dissolved, emulsified or otherwise dispersed in an organic solvent or liquid carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The coating composition of the present invention suitably contains about 10–90%, more typically 40–80% by weight of the binder, and about 10–90%, more typically 20–60% by weight, of an organic solvent carrier.

The stabilized microparticles of the present invention, prepared as describe above, have a particle size range on average of about 0.1 to 10 microns. They can be added to a solution or dispersion of film-forming polymers or resins. The percent by weight of linear to graft stabilizers may vary from 1 to 99. The overall composition may suitably contain from about 1 to 70 percent, preferably 5 to 40 percent by weight of binder solids, of the present stabilized microparticles. Suitable film-forming thermoplastic and/or thermosetting polymers include, but are not limited to, acrylic, silane, aminoplast, urethane, polyester, polyol, acid anhydride, or epoxy containing resins, interpolymers, or graft polymers, and mixtures thereof and copolymers comprising one or more alkyl esters of acrylic acid or methacrylic acid and styrene. Typically a main or combination of main film-formers are used together with a crosslinking agent, such as melamine,isocyanate, blocked isocyanate, silane or epoxy. However, it is noted that the presently claimed stablized microparticles can be used with a wide variety of coating compositions and chemistries and is not limited to use with any particular kind of film-forming polymer and crosslinker.

Typically, the dual stabilized microparticles of the present invention is used in combination with at least one main film-former solution polymer. This solution polymer has a weight average molecular weight of 1500 to 50,000, preferably 2500 to 20,000. All molecular weights disclosed herein are determined by gel permeation chromatography using a polystyrene standard.

A solvent is also typically utilized in the present composition, preferably in minimal amounts, to facilitate formulation and application of the coating compositions of the present invention. An organic solvent is utilized which is compatible with the components of the composition. The amounts of film-forming polymers, curing agent, and catalyst will, of course, vary widely depending upon many factors, among them the specific components of the composition and the intended use of the composition.

In addition, a composition according to the present invention may contain a variety of other optional ingredients, including pigments, aluminum flakes, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–10% by Weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition may also include conventional formulation additives such as flow control agents, for example, Resiflow® S (polybutylacrylate), BYK 320 and 325 (high molecular weight polyacrylates); rheology control agents, such as fumed silica, microgels, and non-aqueous dispersion polymers; water scavengers such as tetrasilicate, trimethyl orthoformate, triethyl orthoformate, and the like.

When a composition according to the present invention is used as a clearcoat (topcoat) over a pigmented colorcoat (basecoat) to provide a colorcoat/clearcoat finish, small amounts of pigment can be added to the clear coat to provide special color or aesthetic effects such as tinting.

The present composition can be pigmented and used as the colorcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The present composition can be used to coat rigid and flexible plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating compositon by first forming a mill base or pigment dipersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition. The coating composition can be applied by conventional techniques such as spraying, electrostatic spraying, dipping, brushing, flow-coating, rollcoating, and the like. The preferred techniques are spraying and electrostatic spraying. The present composition may be used as an ambient cure, especially for refinish, or at elevated temperature. In OEM applications, the composition is typically baked at 100°–150° C. for about 15–30 minutes to form a coating about 0.1–5.0 mils dry film thickness. When the composition is used as a clearcoat, it is applied over the colorcoat which may be dried to a tack-free state and cured or preferably flash dried for a short period before the clearcoat is applied. The colorcoat/clearcoat finish is then baked or ambient cured as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated or air dried for a predetermined time period to allow simultaneous curing of the base and clear coats. Optionally, the clearcoat can be applied to a partially or fully cured basecoat. In addition, for esthetics, two-tone operations may be employed, for example, the application of a clearcoat on colorcoat/clearcoats and other combinations.

EXAMPLES

Those skilled in the art will be able to practice this invention more easily after referring to the following illustrative examples. Those artisans will no doubt be able to compose numerous variations on the themes disclosed, such as changing the amounts of ingredients slightly but insignificantly from those shown, adding innocuous substances, or substituting equivalent or nearly equivalent components for those shown. All such variations are considered to be within the inventive concept. In the examples, all parts are by weight unless indicated otherwise.

EXAMPLE 1

This example illustrates the synthesis of a linear acrylic stabilizer. To a 5 liter flask fitted with a stirrer, condenser, heating mantle, thermometer and addition funnels is added 525.3 g isobutyl methacrylate, 460.8 g 2-ethylhexyl methacrylate, 199.4 g hydroxyethyl methacrylate and 827.8 g toluene. The mixture is agitated and heated to reflux temperature (130° C.). To this is added over 10 minutes a mixture of 40.3 g toluene, 1.04 g VAZO 88 and 51.2 g of a 0.17% solution of diaquabis(borodifluoro diphenyl glyoximato)cobaltate (III) in methyl ethyl ketone. This is immediately followed by the addition of a mixture of 374.6 g isobutyl methacrylate, 439.2 g 2-ethylhexyl methacrylate, 226.9 g hydroxyethyl methacrylate, 3.95 g of VAZO 88, 200.0 g toluene and 35.0 g xylene over 240 minutes while maintaining reflux. This is followed by a hold period of 30 minutes at reflux. Following the hold period, a mixture of 113.1 g toluene and 0.95 g VAZO 88 is added over 60 mins after which there is a hold period of 60 mins at reflux. A shot of 0.7 g of t-butyl peroctoate is then added and the mixture cooled. The product was measured and found to have a percent weight solids of 62.5, a viscosity according to Gardner-Holdt of X, and a weight average molecular weight of 7000. The percent terminal vinyl unsaturation is greater than 95% as measured by thermogravimetric analysis.

EXAMPLE 2

This example illustrates the preparation of a comb stabilizer according to the present invention. To a 2 liter flask fitted with a stirrer, heating mantle, condenser, thermometer and addition funnel is added 186.5 g toluene, 1084 g 12-hydroxystearic acid and 2.3 g of methyl sulfonic acid. The mixture was agitated and heated to reflux. Heating at reflux is continued to remove 64.1 g of water of condensation and heating is continued until the acid number drops to a value of 33. To the batch is then added, in order, 1.1 g 4-tertiary butyl catechol, 5.7 g toluene, 131.0 g glycidyl methacrylate, 4.3 g of N,N-dimethyl dodecyl amine, and 48.4 g mineral spirits. Heating at reflux is continued until the acid number drops to 2 or less. The mixture is then cooled.

To a 2-liter flask fitted with stirrer, heating mantle, thermometer, addition funnels, and condensor is added 357.9 g of butyl acetate and the solvent agitated and heated to 100° C. To this is then added a mixture of 332.0 g capped poly(12-hydroxystearic acid), 254.1 g methyl methacrylate, 23.9 g glycidyl methacrylate, 149.1 g butyl acetate, 14.6 g VAZO 67, and 114.9 g mineral spirits over 180 mins while maintaining the temperature at 100° C. The reaction mixture is then held at 100° C. for 90 mins. To this is then added, in order, 0.7 g of a 10% solution of 4-tertiary butyl catechol in butyl acetate, 5.0 g methacrylic acid, 0.66 g N,N-dimethyl dodecyl amine, and 20.1 g butyl acetate. The reaction mixture is then heated to reflux. The batch is held at reflux until the acid number drops to a value of 0.5 or less. The batch is then cooled. The weight solids are 40%, the Gardner-Holdt viscosity is p, and the weight average molecular weight is 6000.

EXAMPLE 3

This example illustrates the preparation of a microparticle according to the present invention. To a 5-liter flask fitted with a stirrer, heating mantle, thermometer, addition funnels and condensor is added 33.1 g of comb stabilizer (from example 2), 5.4 g xylene, 41.1 g of acrylic stabilizer (from example 1), 273.3 g of mineral spirits, 259.7 g heptane, 32.2 g butyl acetate, 24.5 g styrene, 42.4 g methyl methacrylate, 1.7 g acrylonitrile, 4.2 g methyl acrylate, 8.5 g hydroxy ethyl acrylate, 3.4 g methacrylic acid, and 7.8 g VAZO 88. This mixture is agitated and heated to 100° C. in 15 to 30 minutes and held at this temperature for 60 mins. This is followed by the addition of a mixture of 237.3 g of the acrylic stabilizer of example 1, 451.1 g mineral spirits, 248.1 g heptane, 29.9 g methacrylic acid, 74.9 g hydroxyethyl acrylate, 359.1 g methyl methacrylate, 37.5 g methyl acrylate, 217.7 g styrene, 14.9 g glycidyl methacrylate, 15.1 g acrylonitrile, and 1.5 g dimethyl ethanol amine together with a mixture of 189.8 g of the comb stabilizer of example 2, 64.4 g isobutyl acetate, 5.3 g VAZO 88, and 64.5 g xylene over a period of 300 mins while maintaining temperature at 100° C. Following this, the temperature is raised to 110° C., and the batch held for 30 mins. A shot of 0.95 g t-butyl peroctoate was then added, the batch held for 150 mins, another shot of 0.95 g t-butyl peroctoate added, and the batch held for 150 mins. The batch was then cooled. The weight solids are 40%, the Gardner-Holdt viscosity is A-4, and the particle size is 320 nanometers as measured by Quasi-Elastic light scattering.

EXAMPLE 4

This example illustrates the preparation of an all acrylic comb stabilizer. To a 2-liter flask fitted with a stirrer, condenser, heating mantle, thermometer and addition funnels is added 20.3 g isobutyl methacrylate, 345.5 g 2-ethyl hexyl methacrylate, 40.6 g hydroxyethyl methacrylate, and 283.8 g toluene. The mixture is agitated and heated to reflux temperature (130° C.). To this is added over 10 minutes a mixture of 16.1 g toluene, 0.35 g VAZO 88 (1,1-azobiscyanocyclohexane), 8.6 g methyl ethyl ketone and 8.6 g of a 0.17% solution of diaquabis(borondifluoro diphenyl glyoximato)cobaltate (III) in methyl ethyl ketone. This is immediately followed by the addition of a mixture of 17.8 g isobutyl methacrylate, 303.2 g 2-ethylhexyl methacrylate, 35.7 g hydroxy ethyl methacrylate, 1.4 g VAZO 88, 68.6 g toluene, and 12.0 g xylene over 240 mins while maintaining reflux. This is followed by a hold period of 30 mins at reflux. Following the hold period, a mixture of 36.4 g toluene and 0.32 g VAZO 88 is added over 60 mins after which there is a hold period of 60 mins at reflux. A shot of 0.23 g of t-butyl peroctoate is then added and the mixture cooled. The percent weight solids was measured and found to be 62.5. The viscosity is a Gardner-Holdt of X+1/2. The percent terminal vinyl unsaturation is greater than 95% as measured by thermogravimetric analysis.

To a 2-liter flask fitted with stirrer, condenser, thermometer, heating mantle, and addition funnels is added 120.4 g butyl acetate, 341.4 g of macromonomer and 42.7 g xylene. The mixture is agitated and heated to 100° C. A mixture of 155.1 g methyl methacrylate, 19.6 g glycidyl methacrylate, 43.7 g styrene, 11.4 g VAZO 88 and 61.5 g butyl acetate is then added to the flask over a period of 180 mins while maintaining the temperature at 100° C. The reaction is then held at 100° C. for 120 mins, after which time the temperature is raised to reflux and the batch held for an additional 60 mins. This is followed by the addition of, in order, 0.65 g of a 10% solution of t-butyl catechol in butyl acetate, 4.43 g methacrylic acid, 0.56 g N,N-dimethyl dodecyl amine and 25.8 g butyl acetate. The batch is held at reflux until the acid number falls to a value of 0.5 or less. At this time the batch is diluted to a weight solids of 38% with 140.6 g butyl acetate and 85.6 g mineral spirits and then cooled.

EXAMPLE 5

This example illustrates the synthesis of a microgel (stabilized microparticle) according to the present invention. To a 5 liter flask fitted with a stirrer, heating mantle, thermometer, addition funnels, and condensor is added 6.0 g of acrylic stabilizer from example 1, 52.8 g of acrylic stablizer from example 4, 233.4 g mineral spirits, 222.6 g heptane, 21.0 g styrene, 41.3 g methyl methacrylate, 7.3 g hydroxyethyl acrylate, 2.9 g methacrylic acid, and 7.8 g VAZO 67. The mixture is agitated and heated to 100° C. To the flask is then added a mixture of 386.7 g mineral spirits, 212.7 g heptane, 25.6 g methacrylic acid, 64.2 g hydroxyethyl acrylate, 352.7 g methyl methacrylate, 185.9 g styrene, 12.8 g glycidyl methacrylate, 1.3 g dimethyl ethanol amine, 6.0 g of acrylic stablizer from example 1, 287.6 g stabilizer from example 4, and 5.3 g of VAZO 67 over a period of 300 mins, while maintaining the temperature constant at 100° C. This is followed by a hold period at 100° C. for 15 mins and an additional hold period of 15 mins at 110° C. A mixture of 1.6 g t-butyl peroctoate and 80 g xylene is then added to the flask over 60 mins while maintaining temperature constant at 110° C. The batch is then held at 110° C. for 120 mins and then cooled. The percent weight solids are 38.5 and the Gardner-Holdt viscosity is A-5.

We claim:

1. A stabilized microparticle or core characterized as having dual stabilization comprising a microparticle having two kinds of stabilizers attached thereto:

(a) a first kind of stabilizing polymer which is a substantially linear acrylic polymer attached exclusively at a terminal end thereof to the microparticle; and (b) a second kind of stabilizing polymer which is a graft polymer comprising an acrylic polymer backbone not soluble in the organic liquid, which backbone is attached to microparticle at a randomly distributed number and location of sites, and a plurality of side chains, pendant from the backbone, which is soluble in organic liquid.

2. The stabilized microparticle of claim 1, wherein the first stabilizing polymer has a number average molecular weight of 1000 to 25,000.

3. The stabilized microparticle of claim 1 in which the microparticle comprises a crosslinked or non-crosslinked acrylic polymer and has an average diameter of 0.01 to 10 microns.

4. The stabilized microparticle of claim 1, wherein the first stabilizing polymer further comprises a crosslinkable reactive functional group.

5. The stabilized microparticle of claim 4, wherein the crosslinkable reactive functional group is selected from the group consisting of epoxy, amine, hydroxyl, acid, anhydride, silane, and amide functional groups.

6. The stabilized microparticle of claim 1, wherein the core comprises one or more monomers selected from the group consisting of methacrylic acid, acrylic acid, acrylonitrile, hydroxyethyl methacrylate or acrylate, methyl methacrylate, methyl acrylate, styrene, glycidyl methacrylate, a silane functional monomer and an isocyanate functional monomer.

7. The stabilized microparticle of claim 1, wherein the microparticle is the product of dispersion polymerization of monomers, in an organic liquid in which the resulting polymer is insoluble, in the presence of the stabilizing polymers.

8. The stabilized microparticle of claim 1, wherein the side chains of said second stabilizing polymer are derived from substantially linear acrylic copolymers having a terminal vinyl unsaturation.

9. The stabilized microparticle of claim 1, wherein the side chains of the second stabilising polymer comprises units of polymerized compounds selected from the group consisting of poly(12-hydroxystearic acid), poly(2-ethylhexylmethacrylate), poly(laurylmethacrylate), and poly(stearylmethacrylate).

10. The stabilized microparticle of claim 1, wherein the first stabilizing polymer, the backbone of the second stabilizing polymer, or the side chain of second stabilizing polymer independently comprise monomers selected from the group consisting of butyl methacrylate or acrylate, isobutyl methacrylate or acrylate, 2-ethylhexyl methacrylate or acrylate, hydroxyethyl methacrylate or acrylate, methyl methacrylate or acrylate, glycidyl methacrylate or acrylate, styrene, methacrylic acid, acrylic acid, itaconic acid or anhydride, maleic acid or anhydride, and an isocyanate, silane or amine functional monomer.

11. A composition for providing a coating upon the surface of a substrate, which comprises:

(A) a film-forming solution polymer;

(B) a volatile organic liquid diluent in which the solution polymer is dissolved;

(C) the stabilized microparticles of claim 1; and (D) a crosslinking agent.

12. The composition of claim 11, further comprising a pigment.

13. The composition of claim 11, wherein the film-forming solution polymer is a copolymer comprising one or more alkyl esters of acrylic acid or methacrylic acid and styrene.

14. The composition of claim 11, wherein the film-forming solution polymer is selected from the group consisting of a polyester, polyester polyol, a polyurethane, a silane-functional or epoxy-functional polyacrylic, and a polyester urethane polymer.

15. The composition of claim 11, wherein the composition comprises one or more rheology control agents selected from the group consisting of silica, a microgel, and rheological non-aqueous dispersed polymer.

* * * * *